April 10, 1945.  E. R. LOWE  2,373,321
CHUCK
Filed Jan. 2, 1943  2 Sheets-Sheet 1
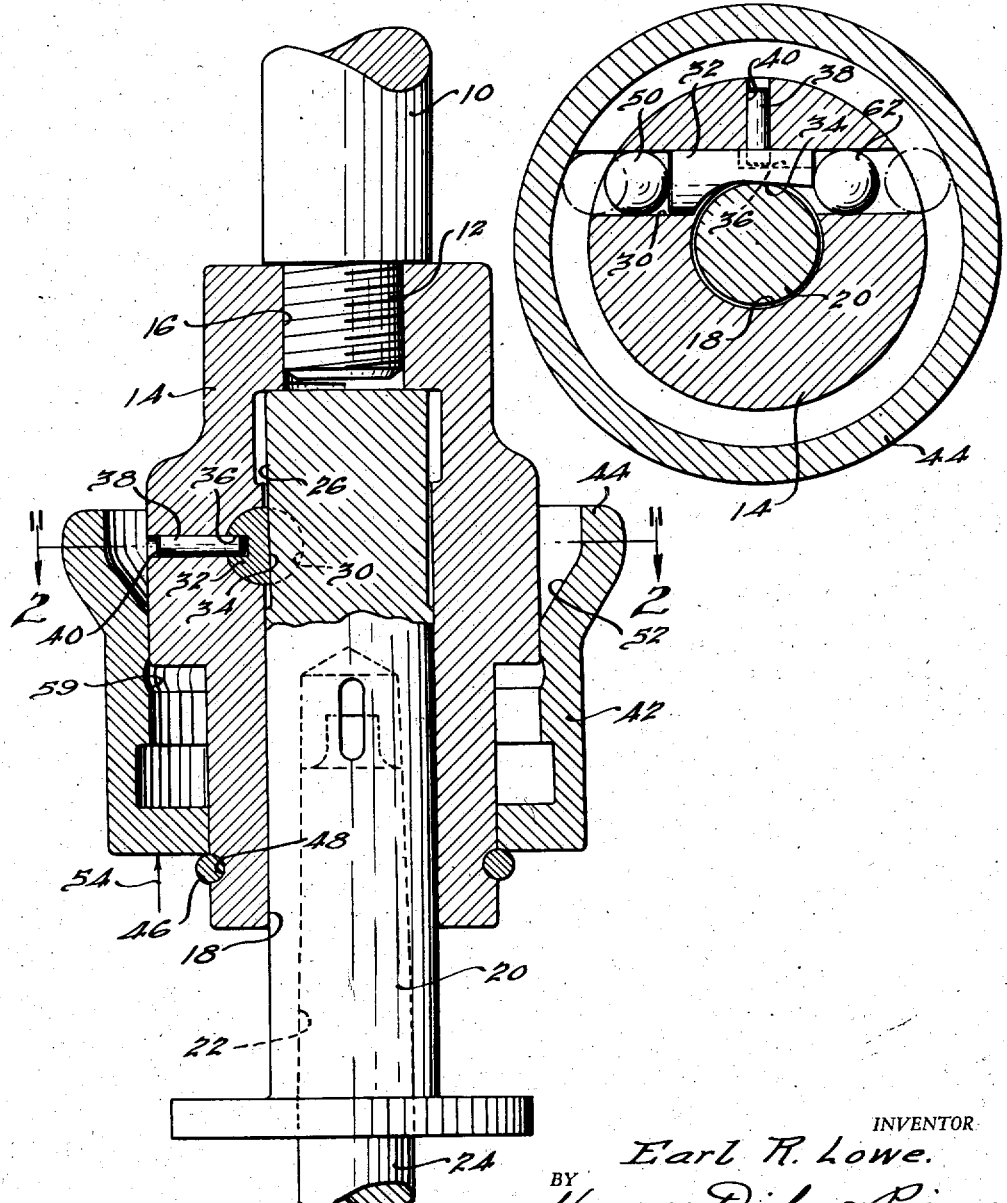

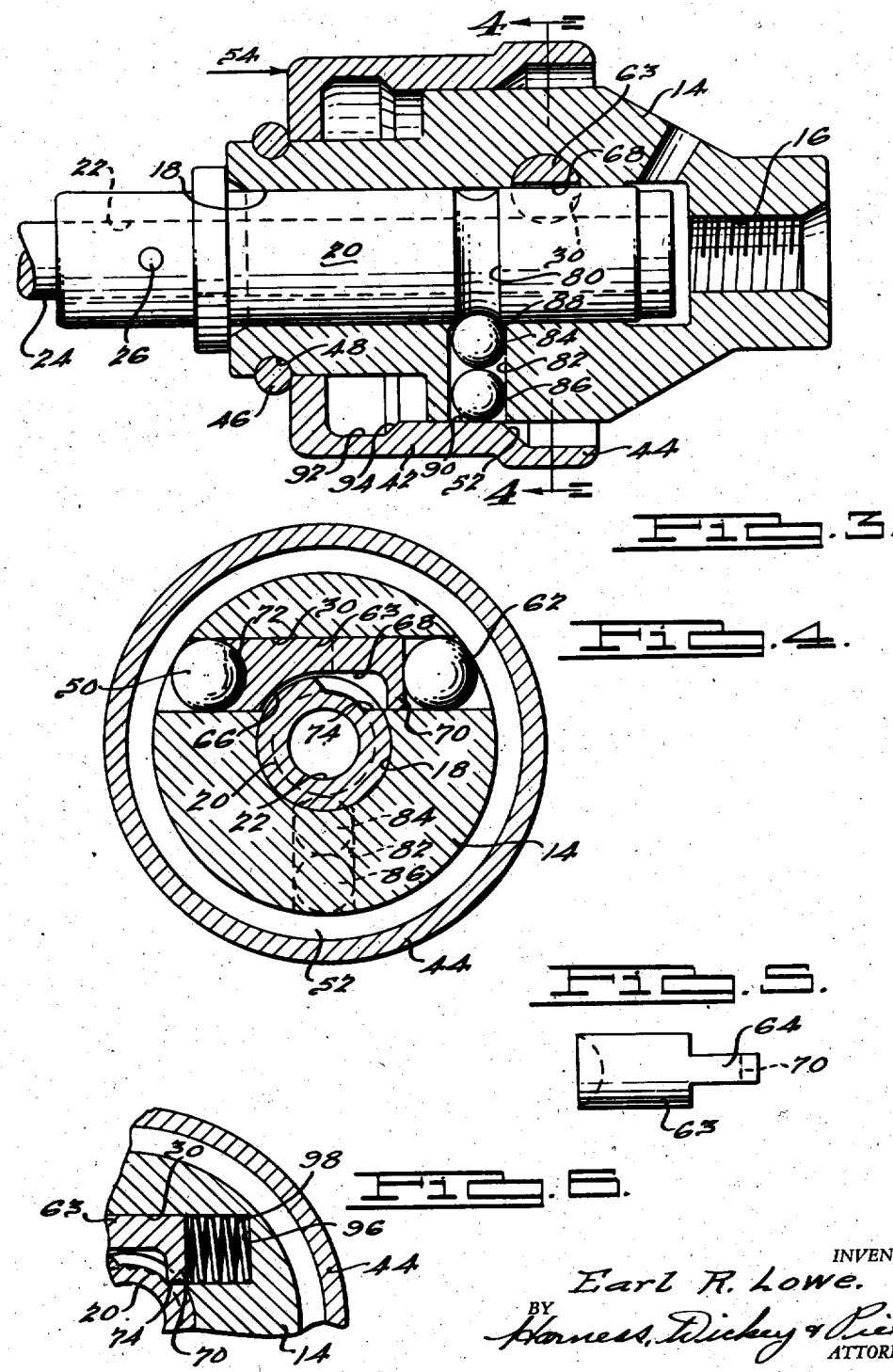

Patented Apr. 10, 1945

2,373,321

UNITED STATES PATENT OFFICE 2,373,321

CHUCK

Earl R. Lowe, Detroit, Mich.

Application January 2, 1943, Serial No. 471,110

10 Claims. (Cl. 279—82)

The present invention relates to quick change chucks particularly adapted for use on drill presses and portable drills.

This application is a continuation-in-part of the copending application of Earl R. Lowe, Serial No. 445,027, filed May 29, 1942.

In prior quick change drill chucks, an axially sliding, locking sleeve has been provided which when shifted positively actuates a locking dog in a direction to lock the drill against rotation relative to the chuck, in combination with resilient or non-positive means to release the dog when the sleeve is returned to release position. In these chucks, the dog which may be in the form of a ball is forced into a recess in the drill adapter by the sleeve to effect the locking operation. These chucks are subject to the objection that if the chuck is rotating at high speed the dog cannot be forced into the recess until the drill approaches the speed of the chuck. Consequently, the sleeve cannot be readily shifted to locking position and if the chuck opens downwardly, the drill will fall out unless it is held until the locking action takes place.

It is the general object of the present invention to provide an improved self-contained, quick change drill chuck of simple construction.

Another object of the present invention is to provide a quick change drill chuck in which the locking means is not positively moved into locking position by the axially movable sleeve, but is rendered independently operable upon movement of the sleeve to locking position.

Another object of the invention is to provide a positive release for the locking means when the sleeve is shifted out of locking position.

Another object is to provide a chuck of the type mentioned from which the drill cannot fall by gravity after the sleeve has been shifted to locking position even though the chuck opening faces downwardly and the locking means has not locked the drill against rotation with respect to the chuck.

Another important object of the invention is to provide a centrifugally operated locking means in a self-contained chuck of the type mentioned.

Other objects of the invention will become apparent from the following specification, the drawings relating thereto, and from the claims hereinafter set forth.

In the drawings, in which like numerals are used to designate like parts in the several views throughout:

Figure 1 is a vertical cross-sectional view, with parts in elevation, of one form of a chuck embodying features of the present invention and showing such chuck mounted on the drill spindle and with the drill and socket in operating position;

Figure 2 is a cross-sectional view taken substantially along the line 2—2 of Figure 1;

Figure 3 is a view similar to Figure 1 illustrating another, preferred form of the present invention;

Figure 4 is a cross-sectional view taken substantially along the line 4—4 of Figure 3;

Figure 5 is a plan view of the centrifugally movable element employed with the construction of Figure 3; and Figure 6 is a fragmentary cross-sectional view illustrating a modified form of the construction shown in Figures 3 and 4.

Referring to the drawings, and referring particularly to Figures 1 and 2 thereof, one embodiment of the invention is illustrated in which a vertical drill spindle is indicated at 10 and has the lower end thereof reduced and threaded, as indicated at 12. A chuck body 14 is provided having a tapped, axial aperture 16 therein which is adapted to be threaded on the threaded end 12 of the drill spindle 10. The chuck body 14 is thus mounted to the spindle 10 for rotation therewith.

The chuck body 14 is provided with an axially extending, cylindrical socket 18 therein which is adapted to removably receive therein a drill adapter 20. Such adapter 20 is formed with the usual tapered recess 22 therein within which the shank of a drill 24 is wedged for rotation with the adapter 20 in the usual way. However, such recess 22 may be cylindrical in form to accommodate cylindrical shank drills when such are used. The drill 24 and the adapter 20 are adapted to be removably received within the recess or socket 18, and are retained therein or released therefrom by the novel means of the present invention. The adapter 20 is generally cylindrical in form, and the upper end thereof is preferably provided with a slight taper, as indicated at 26. Such taper extends downwardly and inwardly from the upper end of the adapter 20, and may be, for example, approximately two degrees.

The chuck body 14 is provided with a transverse, cylindrical opening 30 therethrough which is offset to one side of the axis of the recess 18 but it is so positioned and is of such a size that it partially intersects such recess 18 substantially normal thereto.

A cam locking dog 32 is slidably disposed within the opening 30. Such dog 32 is generally in the form of a cylinder having a portion thereof removed to provide a cam surface 34. Such cam surface 34 is sloped upwardly and toward the left, viewing Figure 2, to such a degree that it exerts a wedging action against the adapter 20. The cam surface 34 is also so shaped that it follows the taper of portion 26, as shown in Figure 1.

A slot 36 is formed in the outer edge of the dog 32 and is adapted to receive the inner end of a pin 38 therein so as to prevent the dog 32 from cocking or turning about its axis. The pin 38 is pressed into an aperture 40 formed in the chuck body 14.

According to the broader aspects of the present invention, instead of providing the tapered portion 26, such portion may be straight or cylindrical in form, in which event the cam portion 34 is straight or complementary in form. It has been found that such a structure gives satisfactory results, although the taper above described is preferred.

As stated above, the dog 32 may slide within the aperture 30. Since a portion to one side of the center has been removed, it will be appreciated that the greater mass of the dog is disposed to one side of the axis of rotation of the spindle. When the spindle is rotated, the dog moves outwardly under the action of centrifugal force. When it moves toward the left, viewing Figure 2, it will be understood that the cam surface 34 will wedge against the portion 26 of the adapter 20 and thereby wedge such adapter to the chuck body 14. Movement of the dog 32 in the opposite direction is limited by the inner shoulder formed in the recess 36. The cylindrical portion of the dog 32 is offset to one side of the axis of the chuck, and it will be appreciated that when the chuck rotates the dog 32 will move to the left, viewing Figure 2, to its wedging position under the influence of centrifugal force.

In order to provide for quickly releasing the socket 20, together with the drill 24, means are provided including an axially movable sleeve 42 having an outwardly offset annular portion 44. Such sleeve 42 is mounted in embracing relationship to the body 14 and is limited in its downward movement by means of a split ring 46 which is adapted to be snapped within an annular groove 48 formed in the lower end of the chuck body 14.

A ball 50 is disposed within the opening 30 and will be thrown outwardly to the position shown by broken lines in Figure 2 when the drill chuck is rotated. The ball will, therefore, be thrown outwardly against the annular portion 44 of the release sleeve 42. The sleeve 42 is provided with an annular, inner cam surface 52.

It will thus be appreciated that with the drill chuck rotating the operator may grasp the sleeve 42 and move it upwardly in the direction indicated by the arrow 54. When it is moved up during such rotation, the spindle 14 still being free to rotate with respect to the member 42, the annular cam surface 52 will engage the ball 50 and force it inwardly to such a position that it abuts against the adjacent surface of the dog 32 and forces it toward the right, viewing Figure 2. When the member 32 is forced to the right, the wedging action of the cam surface 34 is relieved so that adapter 20, together with the drill, may be removed from the chuck. Another adapter, together with another drill, may be inserted in the press. The balls 50 and 62 will be held within the annular, inner groove 59 by centrifugal force to hold the sleeve 42 in its elevated position until moved downwardly by hand. The ball 50 and the member 32 will then move outwardly under the influence of centrifugal force so that the dog 32 wedges the sock 20.

If the drill spindle is directed upwardly, so that the force of gravity would not hold sleeve 42 in its locking position shown, centrifugal force acting on the balls 50 and 62 will hold them against the annular cam surface 52 and prevent the member 42 from moving to its releasing position.

The ball 62 is disposed in the opening 30 on the opposite side of the dog 32 from the ball 50, so as to counter-balance the structure during operation.

In the embodiment specifically described above, the adapter 20 is used in order to permit the use of several drill sizes in the same chuck. However, according to the broader aspects of the present invention, if only one size drill or drill shank is employed, the adapter 20 may be dispensed with.

It will be observed that as soon as the drill is inserted in the chuck, the sleeve 42 may be shifted to and will stay in its locking position even though the drill has not yet come up to the speed of the chuck. The locking cam will immediately engage the adapter by a friction or wedging engagement and bring it up to the speed of the chuck. The first engagement of dog 32 with the adapter will prevent the drill from falling out of the chuck.

Referring to Figures 3, 4, and 5, there is shown an embodiment of the present invention which is preferred for very small diameter drills, such as used in small high speed portable electric drills where the cam friction grip of the previous form may not apply sufficient torque due to the small diameter of the drill and adapter. Similar numerals are used to designate parts corresponding to those described above in connection with the embodiment of Figures 1 and 2. The chuck body 14 is provided with a tapped, axial aperture 16 therein which is adapted to be threaded onto the end of the drill spindle. The chuck body 14 is thus mounted to the drill spindle for rotation therewith.

The chuck body 14 is provided with an axially extending, cylindrical socket 18 therein which is adapted to removably receive a drill adapter 20. Such adapter 20 is formed with the usual recess 22, which may be tapered to receive the shank of a drill 24 or which may be cylindrical to receive the cylindrical shank of such a drill which may be fixed to the adapter by means of solder poured into hole 26. The drill 24 and the adapter 20 are adapted to be removably received within the recess or socket 18, and are retained therein or released therefrom by the novel means of the present invention. The adapter 20 is generally cylindrical in form, and the upper end of the adapter in this embodiment is also cylindrical, rather than tapered as in the embodiment described above.

The chuck body 14 is provided with a transverse, cylindrical opening 30 therethrough which is offset to one side of the axis of the recess 18 but is so positioned and is of such a size that it partially intersects such recess 18 substantially normal thereto, as in the previous form of the invention.

A locking dog 63, corresponding to the dog 32 above described but of a different construction, is slidably disposed within the opening 30. Such dog is generally in the form of a cylinder having portions thereof removed to provide a reduced extension 64 adjacent one end thereof and to provide a curved surface 66 and a straight surface 68 adjacent the peripheral surface of the adapter 20. The straight surface 68, by co-operating with the adapter, prevents rotation of the dog within the opening 30. The curved surface 66 is preferably on an arc having as its center the center of the adapter 20. The right end, viewing Figures 4 and 5, of the dog 63 terminates in an inwardly disposed stop portion or detent portion 70. The opposite end of the dog 63 is formed with a semispherical recess 72. With the removed portion to one side of the center of the dog 63, the greater mass of the dog is disposed to one side of the axis of rotation of the spindle, as in the embodiment described above.

The adapter 20 is formed with a recess 74 in a position adjacent the inner edge of the opening 30 and on the side of its axis adjacent the driving detent 70. The recess 74 is complementary in shape to the shape of the adjacent corner of the detent 70, so that when such corner is received within the recess 74 and contacts the end wall of the recess the adapter 20, together with the drill 24, will be positively driven by the socket 18. The recess 74 may be formed by an end mill of the same diameter as opening 30 and which is fed into depth on the axis of the opening 30, whereupon the adapter is rotated to elongate the recess. The elongation of the recess 74 provides a greater time interval within which the dog 63 can move into locking position when the chuck is rotating with respect to the adapter.

The dog 63 may slide within the aperture 30 and moves to the left, viewing Figure 4, upon rotation of the chuck under the influence of centrifugal force. When moved to the left, the inner corner of the detent 70 is received within the recess 74 to prevent rotation and axial displacement of the adapter, as mentioned above. Such adapter cannot be removed from the chuck until the dog 63 is moved to the right, as shown in Figure 4.

In order to provide for quickly releasing the adapter 20, together with the drill 24, means generally similar to those described above in connection with the embodiment of Figures 1 and 2 are provided which include an axially movable sleeve 42 having an outwardly offset, annular portion 44. Such sleeve 42 surrounds the body 14 and is limited in its movement in one direction by means of a split ring 46, which is adapted to be snapped within an annular groove 48 formed in the adjacent or drill end of the chuck body 14.

A ball 50 is disposed within the opening 30 to one side of the dog 63 and will be thrown outwardly against the offset portion 44 of the release member 42 when the chuck is rotated. Such release member 44 is provided with an annular, inner cam surface 52 adjacent the straight portion of the offset 44.

It will thus be appreciated that when the drill chuck is rotating the dog 63 is in its locking position and the ball 50 is thrown outwardly, as mentioned above. While the chuck is rotating, the operator may grasp the release member 42 and move it in the direction indicated by arrow 54. When the release member is so moved during rotation, the spindle 14 still being free to rotate with respect to the release member 42, the annular cam surface 52 will engage the ball 50 and force it inwardly to such a position that it abuts against the semispherical recess 72 of the dog 63 and forces such dog toward the right, viewing Figure 4. When the dog 63 is forced to the right, the detent 70 moves out of engagement with the stop recess 74 so that the adapter 20, together with the drill, may be removed from the chuck. Another adapter, together with another drill, may then be inserted in the chuck.

Another ball 62 is disposed within the recess 30 on the opposite end of the dog 63 and is thrown out against the offset portion 44 in the same manner as the ball 50. Such other ball 62 is primarily for the purpose of counterbalancing the ball 50.

The semispherical recess 72 in dog 63 is of advantage in that it will become coated by a film of the lubricating oil employed in the chuck and adhere to the ball 50, thus enabling the weight of the ball 50 to assist in shifting the locking dog into locking position. This is particularly advantageous in very small size drill chucks. The ball 50 itself is employed to reduce friction on the sleeve 42; otherwise the dog 63 could be extended farther to the left as viewed in Fig. 4 to increase the weight to the left of the vertical center line of Fig. 4.

It will be observed that in this form of the invention the detent 70 will not shift into the recess 74 until the adapter approaches the rotative speed of the chuck. Consequently, if the chuck opening faces downwardly, the drill and adapter might fall out of the chuck by gravity unless held up by hand until the detent engages in the recess.

To avoid the above mentioned difficulty, there is provided in the adapter a continuous annular curved recess 80 which is adapted to be disposed adjacent a radial aperture 82, formed in the chuck body, when the adapter is in its operating position. Balls 84 and 86 are received within the aperture 82, and the inner end of such aperture 82 is reduced, as indicated at 88, so that the inner ball 84 may be received within the annular recess 80 to hold the drill within the chuck. This means is also effective to hold the drill in the chuck when the chuck is not rotating. When the sleeve 42 is in its locking position, the outer ball 86 bears against a straight portion 90 of the member 42, which terminates in an enlarged portion 92. When the member 42 is moved to the releasing position, as mentioned above, the balls 84 and 86 are then thrown outwardly into the enlarged portion 92 so that the adapter may be removed. Also, when in this position the outer ball 86 will bear against a tapered, annular shoulder 94 so as to hold the sleeve in its released position when the chuck is rotating and when the adapter has been removed for the insertion of another adapter.

Referring to Figure 6, a modified form of structure shown in Figures 3 to 5 is illustrated which is particularly adapted for use on larger, slow speed drills, but may also be employed for smaller drills if desired. In such embodiment, the ball 62 is dispensed with and the recess 30 terminates at one end in a wall 96. A compression spring 98 is then disposed in the recess 30 and has one end abutting against the wall 96 and its opposite end abutting against the adjacent end of the dog 63. This spring may either be a light spring to assist the centrifugal action due to the rotative speed of the drills so that a positive lock of the dog with the adapter is insured even at low speeds, or it may be made sufficiently heavy to perform the entire locking action, in which event the overbalance of weight of dog 63 to the left of the vertical center line may be dispensed with. When the sleeve 42 is removed to its releasing position, the action of the spring is overcome so that the adapter may be removed. The spring for actuating the dog as shown in Figure 6 may also be employed in the form of invention shown in Figures 1 and 2, if desired, but centrifugal actuation is preferred in both modifications.

It will be observed that in all forms of the invention, the locking sleeve does not positively actuate the locking dog in locking direction, but does positively release the locking dog. Moreover, it is not necessary to hold the drill in position until the locking action is complete. The sleeve may be shifted freely to locking position as soon as the drill is inserted and it is unnecessary to hold the drill after the sleeve has shifted.

What is claimed is:

1. A quick change chuck including a body having an axial opening to receive a substantially cylindrical element to be driven by the chuck, said element having a recess and an annular groove spaced from the recess, a locking detent mounted in the body and adapted to move into and out of said element recess, a retaining device mounted in the body and adapted to move into and out of said element groove, means for non-positively urging said detent into said recess, and manual means for controlling the operation of said detent and device including a member movably mounted on the body effective in one position to positively shift the detent out of said recess against the influence of said means and effective in another position to positively shift said device into said groove and permit said first mentioned means to shift said detent into the recess.

2. A quick change chuck including a chuck body having a cylindrical axial socket, said socket being adapted to receive therein a cylindrical element to be connected thereto, movable retaining means disposed within the confines of said body and movable transversely thereof in a direction to make retaining engagement with said element in response to centrifugal force imposed by the rotative action of the chuck body, said retaining means being adapted to make a driving engagement with the element when the chuck body is rotating and the element is not rotating in order to permit insertion of the element without stopping the rotation of the body, and release means including a sleeve rotatably mounted on the body and adapted on axial displacement to move said retaining means in the opposite transverse direction to a position entirely out of said socket to permit insertion or removal of said element while the body is rotating.

3. A quick-change chuck including a chuck body having a cylindrical axial socket, said socket being adapted to receive therein a cylindrical element to be connected thereto, means forming an aperture in said body intersecting said socket and extending transversely thereof, a movable retaining member in said aperture adapted to make driving engagement with said element and having its greater mass disposed to one side of the axis of said socket and movable transversely thereof in a direction to make driving engagement with said element in response to the rotative action of the chuck body, said member being movable entirely out of said socket to permit an unrestricted insertion of said element while the body is rotating, and means rotatably journaled on the body and movable axially thereon for moving said member out of said socket to permit insertion or removal of said element while the chuck is rotating.

4. A chuck including a chuck body having an axial socket, said socket being adapted to receive therein an element to be connected thereto, means forming an aperture in said body intersecting said socket and extending transversely thereof, a movable retaining member adapted to engage said element disposed within said aperture and having its greater mass disposed to one side of the axis of said socket and movable transversely thereof in a direction to make retaining engagement with said element in response to centrifugal force imposed by the rotative action of the chuck body, a ball member disposed within said aperture and engageable with one end of said movable member, said ball member being movable outwardly beyond the confines of said chuck body when said retaining member engages said element to retain the same, and a movable sleeve member disposed on said body and having an outwardly offset annular portion adapted to engage said ball member to limit the outward movement of said ball member when the sleeve is in one position and having a tapered portion to move said ball member inwardly when the sleeve is moved to another position to thereby shift said movable member to releasing position.

5. A chuck including a chuck body having an axial socket, said socket being adapted to receive therein an element to be connected thereto, means forming an aperture in said body intersecting said socket and extending transversely thereof, a movable retaining member adapted to engage said element disposed within said aperture and having its greater mass disposed to one side of the axis of said socket and movable transversely thereof in a direction to make retaining engagement with said element in response to centrifugal force imposed by the rotative action of the chuck body, a ball member disposed within said aperture on one side of said movable member and engageable with the end of said movable member, said ball member being movable outwardly beyond the confines of said chuck body in response to centrifugal force imposed by the rotative action of the chuck body, and a movable sleeve member disposed on said body and adapted on axial movement of the sleeve relative to the body to engage said ball member to move the same inwardly and thereby shift said movable member to releasing position, said sleeve having a pair of axially spaced enlargements of its internal surface to receive said ball whereby the ball under the influence of centrifugal force will act to retain said sleeve yieldingly in two axially spaced positions.

6. A quick-change chuck including a chuck body having a cylindrical axial socket, said socket being adapted to receive therein a cylindrical element to be connected thereto, said element having a recess formed therein, means forming an aperture in said body intersecting said socket and extending transversely thereof, a movable detent disposed within said aperture and movable transversely thereof in a direction to enter said recess in the element and to lock said element against movement in the socket, said detent having its center of mass located on the opposite side of the plane transverse to the aperture and containing the axis of the body from that portion of the detent which enters said recess whereby centrifugal force acts to move the detent into the recess, said detent being movable in the opposite direction entirely out of said socket to permit unrestricted insertion of said element while the body is rotating, and movable means disposed on said body and cooperable with said detent to move the same out of said recess and said socket to thereby release said element.

7. A quick change chuck including a body having an axial opening to receive a substantially cylindrical element to be driven by the chuck, said element having a recess and an annular groove spaced from the recess, said body having a pair of axially spaced transverse apertures intersecting said axial opening, a movable locking detent in one of said apertures having its greater mass disposed to one side of the axis of the socket and movable in said aperture in a direction to enter said recess in response to centrifugal force imposed by the rotative action of the chuck body. a retaining device movable in the other transverse aperture and adapted when moved in one direction to enter said groove, and movable means disposed on the body and cooperable with said detent and device to positively shift the detent out of said recess against the action of centrifugal force when the means is moved in one direction and to positively shift said device into said groove when the means is thereafter moved in the opposite direction.

8. A quick change chuck including a chuck body having a cylindrical axial socket, said socket being adapted to receive therein a cylindrical element to be connected thereto, means forming an aperture in said body intersecting said socket and extending transversely thereof, a movable retaining member disposed within said aperture and movable transversely thereof in a direction to make driving engagement with said element said retaining member having its center of mass located on the opposite side of the plane transverse to the aperture and containing the axis of the body from that portion of the member which engages said element whereby centrifugal force acts to move the detent into engagement with the element, said member having a wedge portion adapted to wedge against the periphery of said element when in retaining position, and means disposed on said body and cooperable with said member to positively move it to releasing position to thereby release said element or permit unrestricted insertion of said element while the body is rotating.

9. A quick-change chuck including a body having an axial opening to receive a substantially cylindrical element to be driven by the chuck, said element having a recess and an annular groove spaced from the recess, said body having a pair of axially-spaced transverse apertures intersecting said axial opening, a movable locking detent in one of said apertures, means for non-positively urging said detent into driving engagement with said recess, a retaining device movable in the other transverse aperture and adapted when moved in one direction to enter said groove, and movable means disposed on the body and cooperable with said detent and device to positively shift the detent out of said recess when the movable means is moved in one direction and to positively shift said device into said groove when the means is thereafter moved in the opposite direction.

10. A quick-change chuck including a body having an axial opening to receive a substantially cylindrical element to be driven by the chuck, said element having a recess and an annular groove spaced from the recess, said body having a pair of axially-spaced transverse apertures intersecting said axial opening, a movable locking detent in one of said apertures having its greater mass disposed to one side of the axis of the socket and movable in said aperture in a direction to enter said recess in response to centrifugal force imposed by the rotative action of the chuck body, a retaining device movable in the other transverse aperture and adapted when moved in one direction to enter said groove, and a sleeve journaled on said body and having an internal conical cam portion for positively shifting the detent out of the recess against the action of centrifugal force when the sleeve is shifted axially in one direction and a second internal conical cam portion for positively shifting the device into said groove when the sleeve is shifted axially in the other direction, said cams being so arranged on the sleeve that when the sleeve is shifted in the direction to force the detent out of the recess the device is allowed to leave said groove under the influence of centrifugal force and when the sleeve is shifted in the opposite direction the detent is allowed to enter the recess under the influence of centrifugal force and the device is shifted into the groove.

EARL R. LOWE.

---

CERTIFICATE OF CORRECTION.

Patent No. 2,373,321.   April 10, 1945.

EARL R. LOWE.

It is hereby certified that error appears in the printed specification of the above numbered patent requiring correction as follows: Page 5, first column, line 46, claim 8, before "means" insert --movable--; and that the said Letters Patent should be read with this correction therein that the same may conform to the record of the case in the Patent Office.

Signed and sealed this 31st day of July, A. D. 1945.

Leslie Frazer (Seal)   Acting Commissioner of Patents.

restricted insertion of said element while the body is rotating, and movable means disposed on said body and cooperable with said detent to move the same out of said recess and said socket to thereby release said element.

7. A quick change chuck including a body having an axial opening to receive a substantially cylindrical element to be driven by the chuck, said element having a recess and an annular groove spaced from the recess, said body having a pair of axially spaced transverse apertures intersecting said axial opening, a movable locking detent in one of said apertures having its greater mass disposed to one side of the axis of the socket and movable in said aperture in a direction to enter said recess in response to centrifugal force imposed by the rotative action of the chuck body, a retaining device movable in the other transverse aperture and adapted when moved in one direction to enter said groove, and movable means disposed on the body and cooperable with said detent and device to positively shift the detent out of said recess against the action of centrifugal force when the means is moved in one direction and to positively shift said device into said groove when the means is thereafter moved in the opposite direction.

8. A quick change chuck including a chuck body having a cylindrical axial socket, said socket being adapted to receive therein a cylindrical element to be connected thereto, means forming an aperture in said body intersecting said socket and extending transversely thereof, a movable retaining member disposed within said aperture and movable transversely thereof in a direction to make driving engagement with said element, said retaining member having its center of mass located on the opposite side of the plane transverse to the aperture and containing the axis of the body from that portion of the member which engages said element whereby centrifugal force acts to move the detent into engagement with the element, said member having a wedge portion adapted to wedge against the periphery of said element when in retaining position, and means disposed on said body and cooperable with said member to positively move it to releasing position to thereby release said element or permit unrestricted insertion of said element while the body is rotating.

9. A quick-change chuck including a body having an axial opening to receive a substantially cylindrical element to be driven by the chuck, said element having a recess and an annular groove spaced from the recess, said body having a pair of axially-spaced transverse apertures intersecting said axial opening, a movable locking detent in one of said apertures, means for non-positively urging said detent into driving engagement with said recess, a retaining device movable in the other transverse aperture and adapted when moved in one direction to enter said groove, and movable means disposed on the body and cooperable with said detent and device to positively shift the detent out of said recess when the movable means is moved in one direction and to positively shift said device into said groove when the means is thereafter moved in the opposite direction.

10. A quick-change chuck including a body having an axial opening to receive a substantially cylindrical element to be driven by the chuck, said element having a recess and an annular groove spaced from the recess, said body having a pair of axially-spaced transverse apertures intersecting said axial opening, a movable locking detent in one of said apertures having its greater mass disposed to one side of the axis of the socket and movable in said aperture in a direction to enter said recess in response to centrifugal force imposed by the rotative action of the chuck body, a retaining device movable in the other transverse aperture and adapted when moved in one direction to enter said groove, and a sleeve journaled on said body and having an internal conical cam portion for positively shifting the detent out of the recess against the action of centrifugal force when the sleeve is shifted axially in one direction and a second internal conical cam portion for positively shifting the device into said groove when the sleeve is shifted axially in the other direction, said cams being so arranged on the sleeve that when the sleeve is shifted in the direction to force the detent out of the recess the device is allowed to leave said groove under the influence of centrifugal force and when the sleeve is shifted in the opposite direction the detent is allowed to enter the recess under the influence of centrifugal force and the device is shifted into the groove.

EARL R. LOWE.

---

CERTIFICATE OF CORRECTION.

Patent No. 2,373,321. April 10, 1945.

EARL R. LOWE.

It is hereby certified that error appears in the printed specification of the above numbered patent requiring correction as follows: Page 5, first column, line 46, claim 8, before "means" insert --movable--; and that the said Letters Patent should be read with this correction therein that the same may conform to the record of the case in the Patent Office.

Signed and sealed this 31st day of July, A. D. 1945.

Leslie Frazer (Seal) Acting Commissioner of Patents.